United States Patent [19]
Dove

[11] 3,809,135
[45] May 7, 1974

[54] EARTH WORKING BLADE WITH SAW TEETH

[76] Inventor: Ralph E. Dove, Rte. No. 4, Sedalia, Mo. 65301

[22] Filed: July 27, 1972

[21] Appl. No.: 275,524

[52] U.S. Cl.............. 144/34 F, 83/852, 30/379, 83/928
[51] Int. Cl... A01g 23/08, B27b 11/12, B27b 33/02
[58] Field of Search............ 144/34 F; 83/835, 852, 83/846, 928; 30/379

[56] References Cited
UNITED STATES PATENTS
2,633,880   4/1953   Mattson............................ 144/34 F
3,004,570   10/1961  Clayton et al...................... 144/34 F
3,033,253   5/1962   Purdy................................ 144/34 F
2,659,397   11/1953  Drake................................ 83/852

Primary Examiner—Donald R. Schran
Attorney, Agent, or Firm—Laurence R. Brown, Esq.

[57] ABSTRACT

An earth working machine blade assembly of triangular shape and saw-toothed at the outer edge for mounting parallel and close to the ground apex forward to clear brush and trees in front of a bulldozer.

1 Claim, 2 Drawing Figures

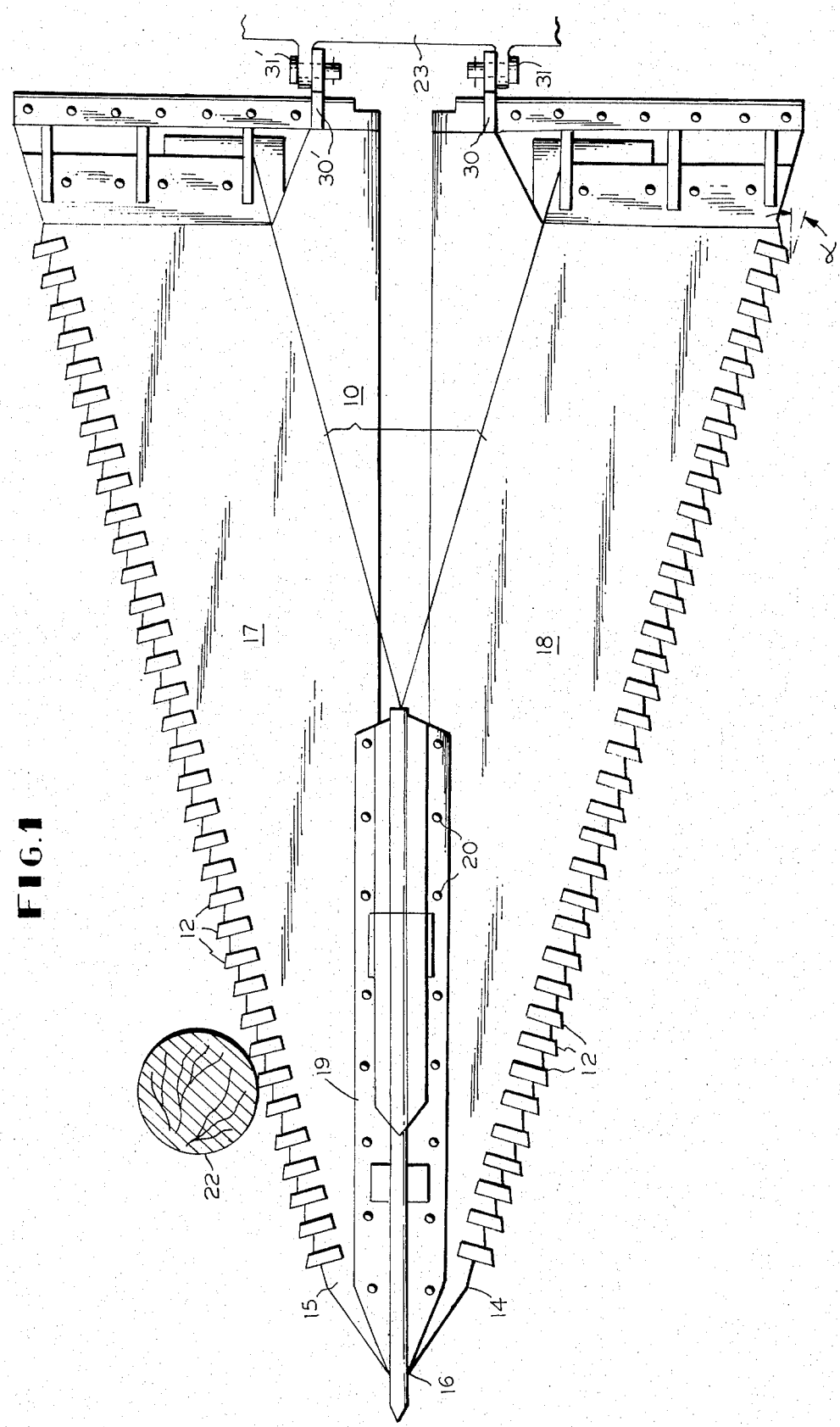

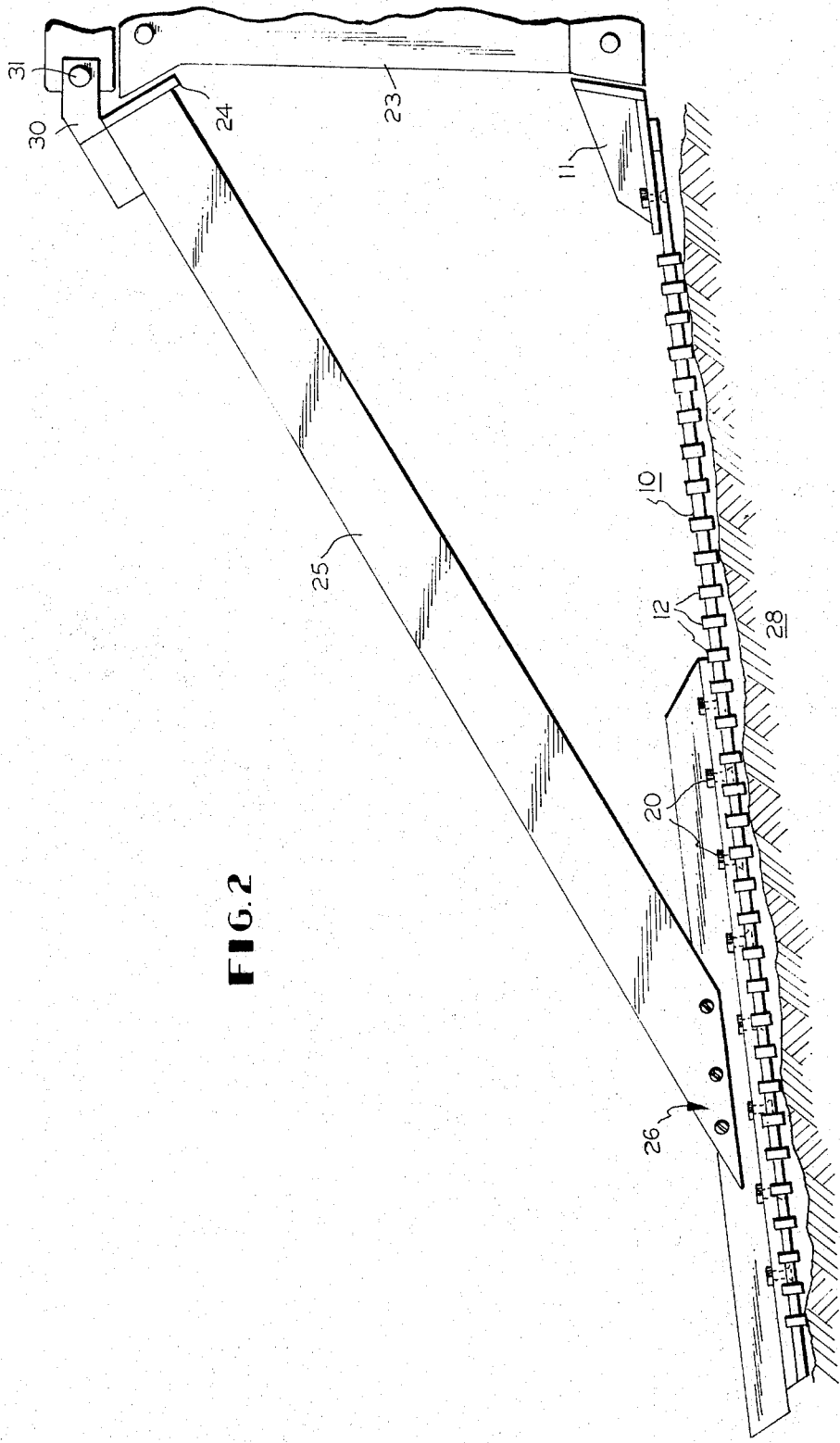

EARTH WORKING BLADE WITH SAW TEETH

This invention relates to earth working machinery and methods and more particularly it relates to implements for mounting on a bulldozer.

Many implements such as blades and scrapers have been fashioned for bulldozers serving to uproot and scrape earth in clearing operations. Some of these have included vibrators and raking mechanisms and the like to improve efficiency, but all such mechanisms have been deficient in removing trees and heavy brush, since they depended upon pushing out the obstacles, and this takes considerable power and maneuverability.

It is therefore an object of this invention to improve the art of removing trees and heavy brush with a bulldozer.

This improvement is achieved by this invention by producing a blade plate assembly that rides on or close to the ground and parallel with it and having saw-tooth structure on its outer edges.

Further objects, features and advantages of the invention will be set forth with reference to the preferred embodiment shown in the accompanying drawings, wherein:

FIG. 1 shows a plan view of an earth working implement blade afforded by the invention, and FIG. 2 shows an elevation view of the implement attached to a bulldozer.

Reference to the drawing shows an implement with a plate-like device 10 of generally triangular configuration with a bumper plate structure 11 mounted on the base and with teeth 12 extending on the two edges 14, 15 backward from the apex 16. Preferably the platelike device 10 is constructed of two similar strips 17, 18 joined at the apex end by the planor side of a steel T plate member 19 riveted, welded or bolted thereto at points 20 etc., the strips forming a generally V-shaped assembly, held at the base end by the bolted-on bumper plate 11.

The teeth 12 preferably are hardened steel having about a 20° pitch α and fastened on steel T plates 17, 18 by welding or otherwise affixing in the manner customary with the use of machine tools in a toolholder assembly. Typically the teeth 12 are 3/4 inch wide by 3 inches long, and they serve to cut into heavy brush or trees 22 at the ground level when pushed in front of bulldozer 23 at the upper and lower bumper plates 24 and 11.

A brace member 25 is affixed to T plate 19 at a position 26 near the apex and this holds and drives the plate device 12 ahead of bulldozer 23 and parallel to the ground 28 riding on or just above it so that it can saw off the tree 22 at ground level with much less force from the bulldozer 23 than would be necessary to push into and uproot it in a conventional manner.

Affixed to the bulldozer end of brace member 25 is a pivot assembly 30, 31 which permits the blade device 12 to pivot upwardly at the apex away from the ground when not in use, it can be held up or pivoted back by an index member or stop (not shown) to keep it out of cutting operation and is readily removable by means of the pivot pins 31, 31$^1$.

Thus in operation the triangular shaped implement is rigidly placed horizontal to the ground apex forward on the front end of a bulldozer for moving therewith. The saw teeth about the outer edge and because of the triangular shape apex forward are forced across and more deeply into brush and trees with a sawing and penetration action so as to completely clear a tree 22 or other obstacle in the path of the bulldozer 23 at ground level as the bulldozer moves forward.

What is claimed is:

1. An earth working implement for cutting trees at ground level with a bulldozer comprising a platelike blade device generally triangular shaped, mounting means at the base of said triangular shaped blade for holding the blade on the bulldozer at substantially ground level to be moved thereby into contact with the trees to be cut and cutting means extending on two edges from the apex of the triangular shaped member toward the base for penetrating and sawing the trees as the blade is moved by said bulldozer consisting of hardened steel teeth cutting members each of identical construction having cutting points affixed to the edges of the blade to present a straight cutting line along said edges, said teeth members being substantially thicker than said blade along their entire length and of a width in the order of 3/4 inch and a length in the order of 3 inches extending back into the blade to thereby produce said penetrating and sawing action as the blade is moved by the bulldozer over a rough ground surface.

* * * * *